United States Patent
Manes et al.

(10) Patent No.: US 7,133,247 B1
(45) Date of Patent: Nov. 7, 2006

(54) SELF EXTENDING, RETRACTABLE COMMUNICATIONS CABLE MECHANISM FOR STORAGE LIBRARY ROBOTICS MODULE

(75) Inventors: Joseph Paul Manes, Arvada, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 517 days.

(21) Appl. No.: 10/728,129

(22) Filed: Dec. 4, 2003

(51) Int. Cl.
*G11B 15/68* (2006.01)
(52) U.S. Cl. ...................................................... 360/92
(58) Field of Classification Search ................ 360/92, 360/98.04, 98.05, 98.06; 369/30.38–30.63
See application file for complete search history.

(56) References Cited

U.S. PATENT DOCUMENTS

| | | |
|---|---|---|
| 5,253,246 A | 10/1993 | Leonhardt et al. |
| 5,285,333 A | 2/1994 | Barr et al. |
| 5,455,810 A | 10/1995 | Luffel |
| 5,544,146 A | 8/1996 | Luffel et al. |
| 5,870,245 A | 2/1999 | Kersey et al. |
| 5,940,356 A | 8/1999 | Toumbas |
| 6,309,162 B1 | 10/2001 | White |
| 6,441,991 B1 | 8/2002 | Ostwald et al. |
| 6,512,962 B1 * | 1/2003 | Dimitri et al. ............... 360/92 |
| 6,515,822 B1 | 2/2003 | White et al. |
| 6,778,351 B1 * | 8/2004 | Coffin et al. ................ 360/92 |

* cited by examiner

*Primary Examiner*—Craig A. Renner
(74) *Attorney, Agent, or Firm*—Brooks Kushman P.C.

(57) ABSTRACT

A robotics module for a storage library includes a robot assembly and a cable mechanism within a housing. A cable is routed around the cable mechanism. An end of the cable is connected to the robot assembly to communicate with the robot assembly. The cable mechanism enables the cable to be pulled out from cable mechanism as the robot assembly moves away from the housing. The cable mechanism prevents the cable from being retracted back into the cable mechanism after the robot assembly has moved out of the housing by wedging the cable with a roller. The cable mechanism enables the cable to be retracted back into the cable mechanism while the robot assembly is in the housing by pulling the roller away from the cable. A retraction handle assembly enables the cable to be manually retracted back into the cable mechanism while the robot assembly is in the housing.

11 Claims, 7 Drawing Sheets

SELF EXTENDING, RETRACTABLE COMMUNICATIONS CABLE MECHANISM FOR STORAGE LIBRARY ROBOTICS MODULE

BACKGROUND OF THE INVENTION

1. Field of the Invention

The present invention relates generally to storage libraries for handling and storing media elements such as cartridges and for reading and writing to the media elements using media element players such as drives. More particularly, the present invention relates to a self extending, retractable communications cable mechanism for use with a communications cable connected to a media element handling robot assembly of a storage library robotics module.

2. Background Art

An automated data storage library generally includes media storage elements such as cartridges, media element players such as drives, and media element handling components such as a media element handling robot assembly. The library includes individual cells which hold respective cartridges. The robot assembly includes a picker which is operable to move about the library and selectively load a cartridge from a cell into a drive. The picker is generally operable to remove cartridges from cells and drives and load cartridges into cells and drives.

Certain storage library designs enable the libraries to be expandable for capacity upgrades. Many storage library expansion solutions require complex installation techniques at the library user's site. Some solutions require costly robot assembly duplication, while other solutions require skilled personnel to link existing robot assemblies with the expansion mechanics. It would be desirable if storage library capacity expansion did not require manipulation, addition, modification, etc., to the robot assembly already part of the storage library.

SUMMARY OF THE INVENTION

Accordingly, it is an object of the present invention to provide a self extending, retractable communications cable mechanism for use with a communications cable connected to a media element handling robot assembly of a storage library robotics module.

It is another object of the present invention to provide a self-contained robotics module for use with a storage library in which the robotics module has a self extending, retractable communications cable mechanism and a media element handling robot assembly connected to a communications cable.

It is a further object of the present invention to provide a self-contained robotics module for use with a storage library in which the robotics module includes a self extending, retractable cable mechanism and a media element handling robot assembly in which the cable mechanism enables a communications cable connected to the robot assembly to be retracted back into the robotics module when the robot assembly is contained within the robotics module in order to facilitate the modular replacement and removal of the robotics module into and out of the storage library.

It is still another object of the present invention to provide a self extending, retractable communications cable mechanism which enables a communications cable connected to a media element handling robot assembly of a self-contained robotics module to self extend out from the cable mechanism as the robot assembly moves away from the robotics module, and to be manually retracted back into the cable mechanism when the robot assembly is moved back inside the robotics module.

It is still a further object of the present invention to provide a self extending, retractable communications cable mechanism which enables a communications cable connected to a media element handling robot assembly of a self-contained robotics module to self extend out from the cable mechanism as the robot assembly moves away from the robotics module, and to be automatically retracted back into the cable mechanism as the robot assembly moves back towards the robotics module.

It is still yet another object of the present invention to provide a storage library robotics module having a self extending, retractable communications cable mechanism and a media element handling robot assembly in which the cable mechanism enables a communications cable connected to the robot assembly, and subjected to a force applied by the robot assembly when the robot assembly moves away from the robotics module, to self-extend out from the cable mechanism as the robot assembly moves away from the robotics module.

In carrying out the above objects and other objects, the present invention provides a storage library. The storage library includes a frame, media element holding cells supported within the frame, and a module supported in the frame. The module has a housing and a robot assembly operable for moving away from a contained position within the housing in order to move toward the cells and manipulate media elements supported by the cells. The module further includes a communications cable routed around a cable mechanism within the housing. One end of the communications cable is connected with the robot assembly for enabling communications with the robot assembly. The cable mechanism is operable for enabling a portion of the communications cable to be pulled out from cable mechanism as the robot assembly moves away from the housing. The cable mechanism is further operable for preventing the pulled out communications cable portion from being retracted back into the cable mechanism after the robot assembly has moved out of the housing. The cable mechanism is further operable for enabling the pulled out communications cable portion to be retracted back into the cable mechanism while the robot assembly is contained in the housing.

The cable mechanism preferably includes a tension spring assembly which is configured to wedge the communications cable with a roller biased under a torque load to prevent the pulled out communications cable portion from being retracted back into the cable mechanism after the robot assembly has moved out of its contained position within the housing. The tension spring assembly is preferably configured to pull away the roller from the communications cable while the robot assembly is contained in the housing to enable the pulled out communications portion to be retracted back into the cable mechanism. The cable mechanism preferably further includes a retraction handle assembly which enables a user to manually retract the pulled out communications cable portion back into the cable mechanism while the robot assembly is contained in the housing.

The module may be removably supportable out of the frame when the robot assembly is contained within the housing and the communications cable is retracted back into the cable mechanism, and may be removably supportable into the frame when the robot assembly is contained in the housing and the communications cable is retracted into the cable mechanism.

The robot assembly preferably includes a platform and the end of the communications cable connected to the robot assembly forms a loop around an extension of the platform. The platform extension applies a force on the cable loop as the robot assembly moves away from the housing causing the portion of the communications cable to be pulled out from the cable mechanism. The force applied by the platform extension on the cable loop is caused by the weight of the platform as the robot assembly moves down and away from the housing.

Also, in carrying out the above objects and other objects, the present invention provides a robotics module for use with a storage library. The robotics module includes a robot assembly and a cable mechanism within a housing. The robot assembly is containable within the housing and is operable for moving away from the housing. A communications cable is routed around the cable mechanism. The communications cable has a first end connected to the robot assembly for enabling communications with the robot assembly. The cable mechanism is operable for enabling a portion of the communications cable to be pulled out from cable mechanism as the robot assembly moves away from the housing.

The cable mechanism is further operable for preventing the pulled out communications cable portion from being retracted back into the cable mechanism after the robot assembly has moved out of the housing. The cable mechanism is further operable for enabling the pulled out communications cable portion to be retracted back into the cable mechanism while the robot assembly is contained in the housing.

Further, in carrying out the above objects and other objects, the present invention provides a cable mechanism for use with a communications cable connected at one end to a robot assembly of a storage library. The cable mechanism includes a retraction handle assembly in a containment box. The cable mechanism further includes a tension spring assembly in and connected to the containment box. The retraction handle assembly is operable for being contained between layers of the communications cable. The tension spring assembly is operable for enabling a portion of the communications cable to be pulled out from retraction handle assembly as the robot assembly moves away from the containment box.

The tension spring assembly is operable for wedging the communications cable with a roller biased under a torque load against the containment box to prevent the communications cable from being retracted back into the retraction handle assembly while enabling the communications cable to be pulled out from the retraction handle assembly. The tension spring assembly is further operable to pull the roller away from the containment box against the torque load to enable the communications cable to be retracted back into the retraction handle assembly when the robot assembly is adjacent the containment box. The retraction handle assembly enables a user to manually retract the communications cable back into the retraction handle assembly when the roller has been pulled away from the containment box.

DETAILED DESCRIPTION OF THE PREFERRED EMBODIMENT(S)

Figure 1:
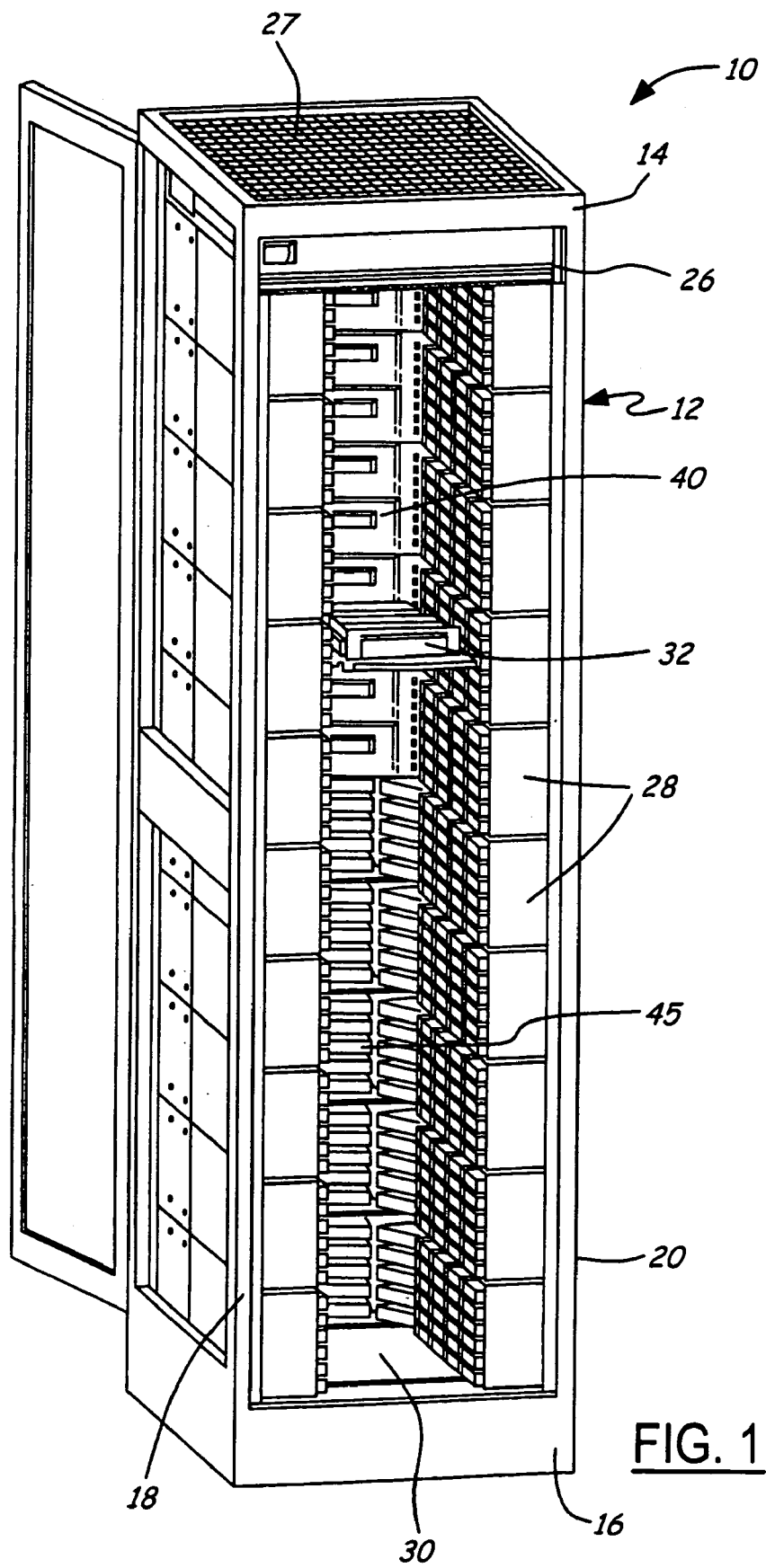
FIG. 1 illustrates a perspective view of a rack-mounted storage library in accordance with a preferred embodiment of the present invention.
Figure 2:
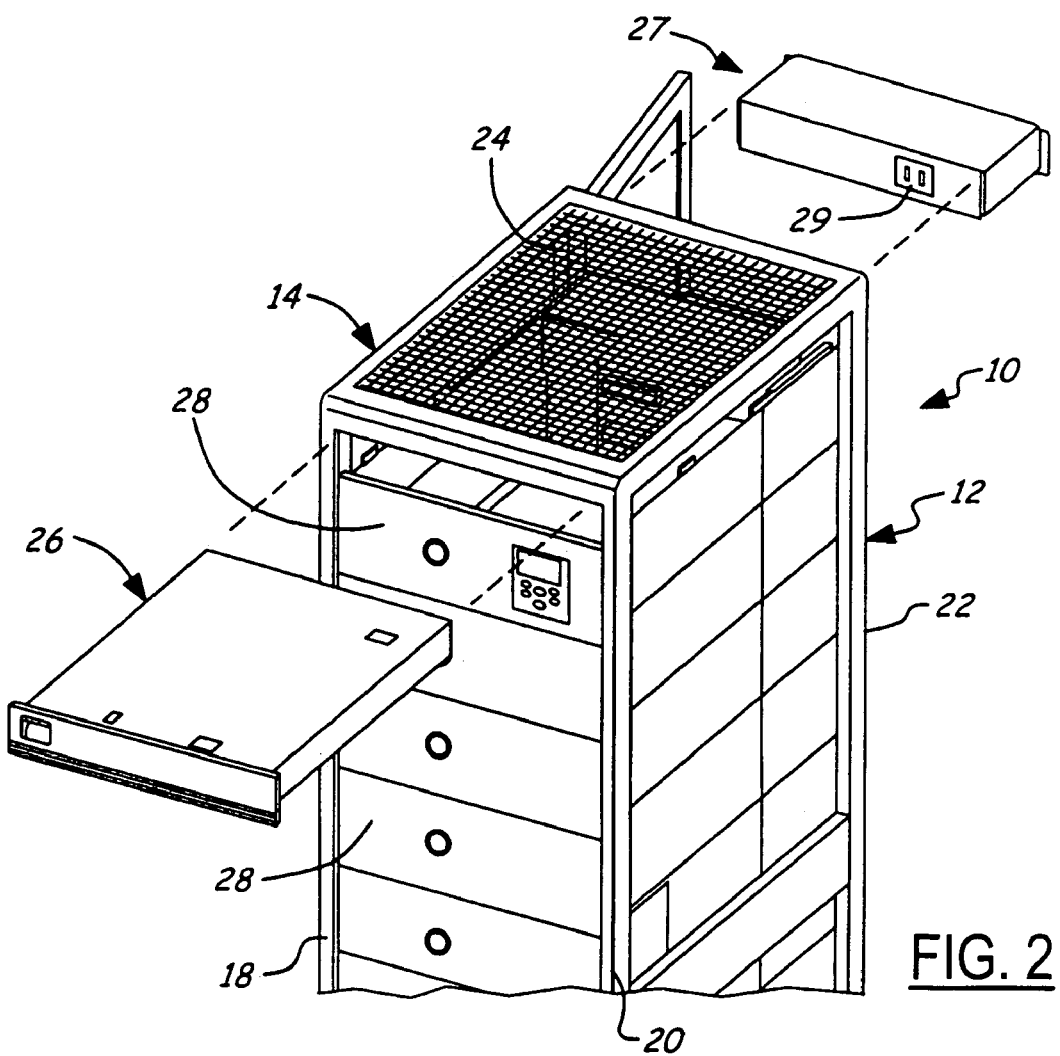
FIG. 2 illustrates a top view of the rack-mounted storage library with a self-contained robotics module and a controller module both being removed out of the rack of the storage library.

Referring now to FIGS. 1 and 2, a rack-mounted storage library 10 in accordance with a preferred embodiment of the present invention is shown. Storage library 10 is a data storage and retrieval system for a computer and is designed for handling and storing media elements such as cartridges and for reading and writing to the media elements using media element players such as drives. A media element denotes any physical substrate suitable for storing data. A media element player is a reader and/or writer, i.e., a drive, which translates the data stored on a media element into signals readable by the computer for reading operations and/or writes data to the media element in response to a command from the computer for writing operations.

Storage library 10 includes a rack (e.g., frame) 12. Rack 12 has a vertically upright, rectangular form formed by top and bottom rack portions 14 and 16 and four legs 18, 20, 22, and 24 extending therebetween. Legs 18, 20, 22, and 24 are placed at respective corners of top and bottom rack portions 14 and 16. Legs 18, 20, 22, and 24 form a rectangular interior within rack 12. Bottom rack portion 16 is placed on a support structure such as a floor to support the weight of storage library 10.

A self-contained media element handling robotics module 26 is positioned within the interior of rack 12 preferably adjacent to top rack portion 14. Robotics module 26 is an integrated replaceable unit which contains media element handling robotics. Robotics module 26 can be plugged into and plugged out from a spacing within rack 12 of storage library 10 in a modular manner. Robotics module 26 may be removed and installed from the front or back side of rack 12 of storage library 10. As shown in FIG. 1, robotics module 26 is plugged into rack 12 within its respective spacing of the interior formed by the rack. As shown in FIG. 2, robotics module 26 is removed out from rack 12. As such, robotics module 26 facilitates modular replacement and removal of the media element handling robotics into and out of storage library 10.

A power/controller module 27 is positioned within the interior of rack 12 preferably adjacent to both top rack portion 14 and robotics module 26 when the robotics module is positioned within the rack. Power/controller module 27 includes a power supply for supplying the power required by the media element handling robotics of robotics module 26. Power/controller module 27 includes control electronics for generating electrical control signals to control the operation of the media element handling robotics of robotics module 26. Power/controller module 27 can be plugged into and removed out from its spacing within rack 12. As shown in FIG. 1, power/controller module 27 is plugged into rack 12 within its respective spacing. As shown in FIG. 2, power/controller module 27 is removed out from rack 12.

Robotics module 26 and power/controller module 27 are electrically connected to one another when both modules are mounted in rack 12. Robotics module 26 and power/controller module 27 include corresponding self-mating plug-connectors 29 on their back sides which plug into one another in order to connect these modules together.

Storage library 10 includes a plurality of storage library modules 28. Storage library modules 28 are positioned within the interior of rack 12. Rack 12 receives each storage library module 28 within a respective spacing provided by the rack. Storage library modules 28 include media elements 45 such as cartridges and/or includes media element players 40 such as drives. Cartridges 45 are individually supported within housing cells in storage library modules 28. Drives 40 are operable to read and write data to cartridges 45 when the cartridges are loaded into the drives.

FIG. 1 illustrates storage library 10 having a storage library module 28 positioned in each available storage library spacing provided by rack 12. Storage library modules 28 are removably connected to and supported by legs 18, 20, 22, and 24. Storage library modules 28 are in a vertical stack and form a continuous channel 30 along their height. Robotics module 26 is positioned above the vertical stack of storage library modules 28. The capacity of storage library 10 may be expanded by inserting storage library modules 28 into rack 12 of the storage library. Similarly, the capacity of storage library 10 may be reduced by removing storage library modules 28 from rack 12 of the storage library.

As indicated above, robotics module 26 includes media element handling robotics, i.e., a media element handling picker assembly 32. Picker assembly 32 is self-containable within robotics module 26. Picker assembly 32 is operable to drop out from robotics module 26 and then move amongst storage library modules 28 by moving up-and-down through channel 30. Picker assembly 32 is operable to selectively grab a cartridge 45 from a cell of one storage library module 28 and then move this cartridge to another location in this storage library module or to any location in the other storage library modules.

In particular, picker assembly 32 is operable to move to a cell holding a desired cartridge 45, engage the desired cartridge and remove it from its cell, move the desired cartridge to a location adjacent to a selected drive 40, and then load the desired cartridge into the selected drive. As noted above, drive 40 may be contained in a different storage library module 28. In this event, picker assembly 32 moves up or down along channel 30 from storage library module 28 containing the desired cartridge 45 to the storage library module containing the desired drive 40. As such, picker assembly 32 is operable to grab a cartridge 45 from a first storage library module 28 located at one end of the stack, move the cartridge along channel 30 to a second storage library module 28 located at the other end of the stack, and load the cartridge into a drive 40 (or another cell) of the second storage library module.

Storage library modules 28 do not contain media element handling robotics. Robotics module 26 provides the media element handling robotics (i.e., picker assembly 32) required for handling the cartridges in storage library modules 28. Picker assembly 32 may include a reader for reading labels on cartridges 45 and drives 40 of storage library modules 28 in order to keep track of the location of the contents of storage library 10.

Figure 3:
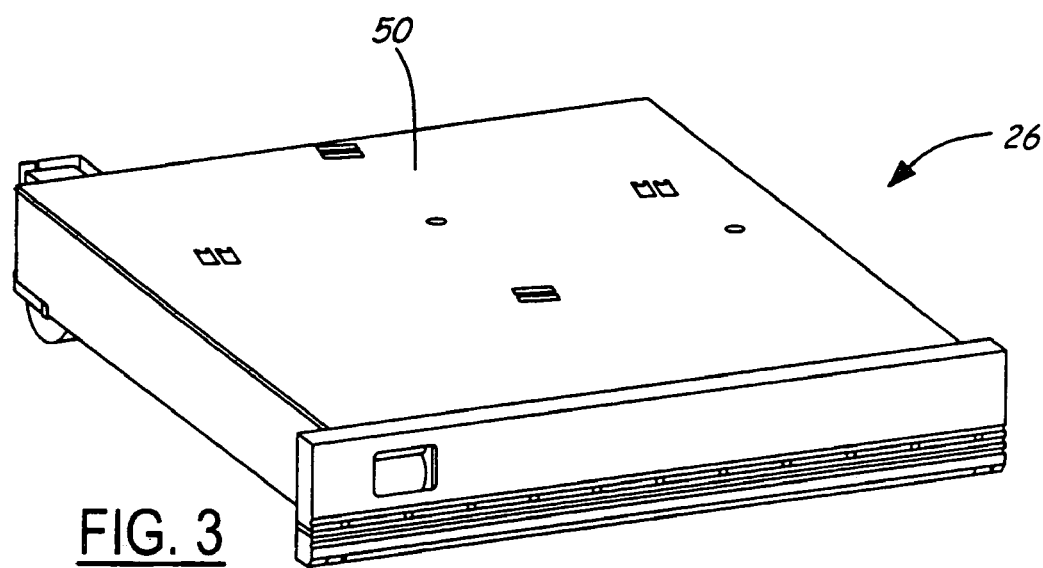
FIG. 3 illustrates a top-side perspective view of the self-contained robotics module in which a media element handling robot assembly is fully recessed within the robotics module and a communications cable is fully retracted within the robotics module.
Figure 4:
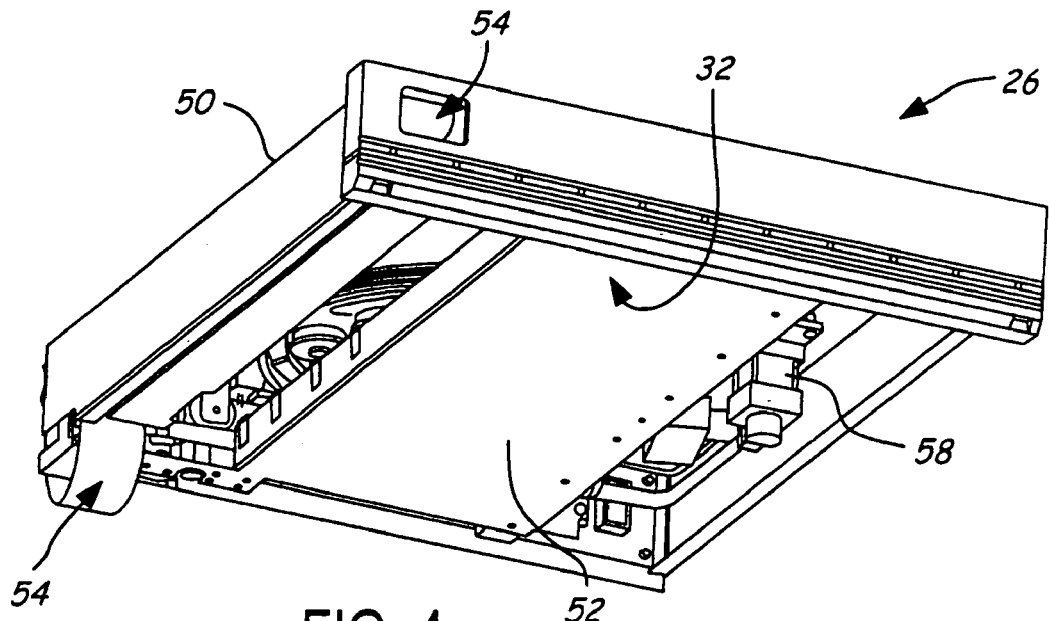
FIG. 4 illustrates a bottom-side perspective view of the self-contained robotics module with the media element handling robot assembly being fully recessed within the robotics module and the communications cable being fully retracted within the robotics module.

Referring to FIGS. 3, 4, 5, 6, and 7, robotics module 26 will now be described in greater detail. FIGS. 3 and 4 respectively illustrate top and bottom side perspective views of robotics module 26. In FIGS. 3 and 4, picker assembly 32 is fully recessed within a housing 50 of robotics module 26 and an electronics communications cable 54 is fully retracted within the robotics module. Picker assembly 32 includes a platform 52. Platform 52 is shown in FIG. 4 as being fully recessed along a bottom-side of housing 50.

When picker assembly 32 is in the fully recessed position within housing 50 of robotics module 26 and communications cable 54 is fully retracted within the robotics module, the robotics module can be removably plugged into and pulled out from its respective spacing in rack 12 of storage library 10. Removing robotics module 26 from rack 12 of storage library 10 effectively removes all of the media element handling robotic assembly hardware out of storage library 10. Similarly, plugging robotics module 26 into rack 12 of storage library 10 effectively adds all of the media element handling robotic assembly hardware to the storage library.

Figure 7:
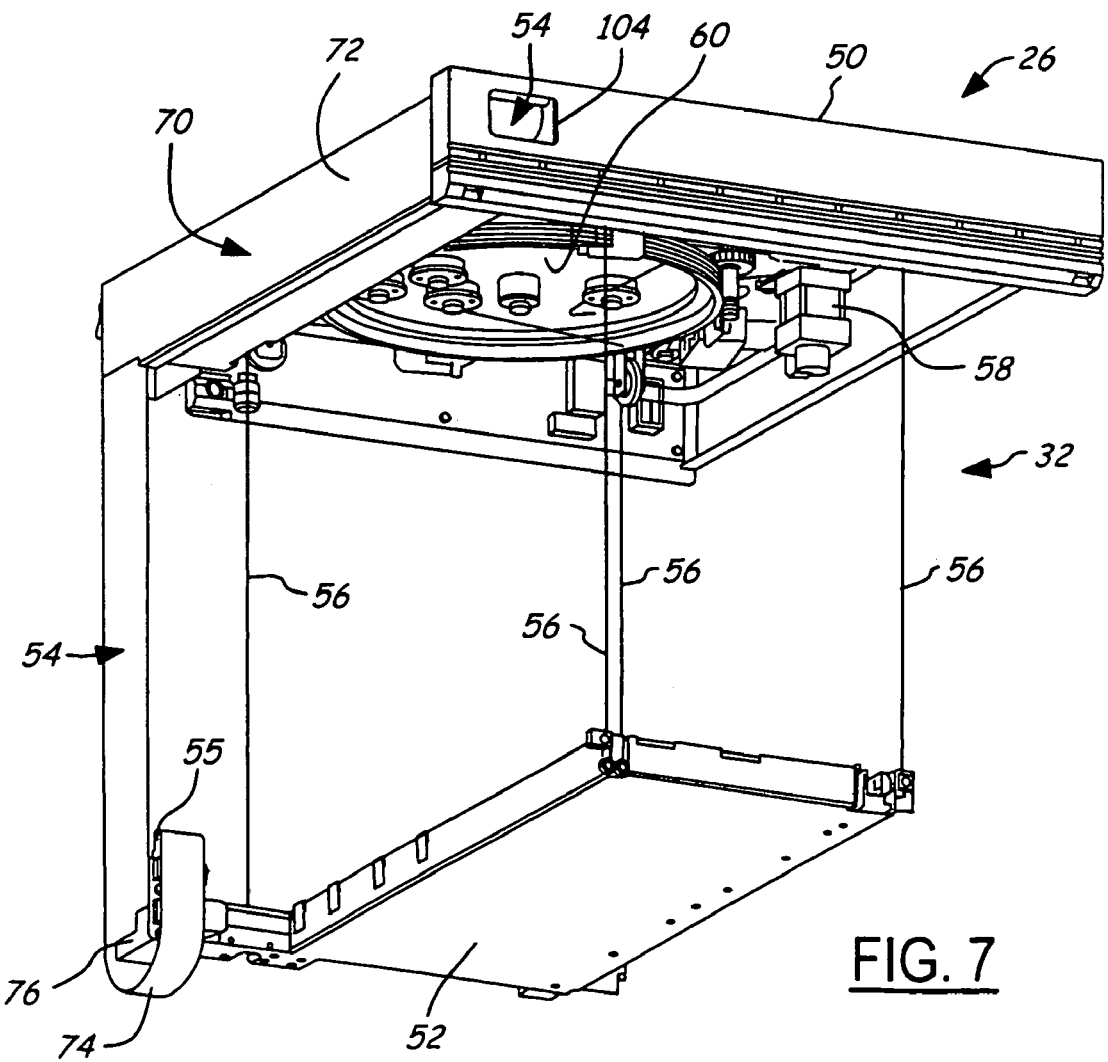
FIGS. 6 and 7 illustrate bottom-side perspective views of the robotics module with the media element handling robot assembly being moved out from its recessed position within the robotics module and the communications cable being extended out from the robotics module.
Figure 5:
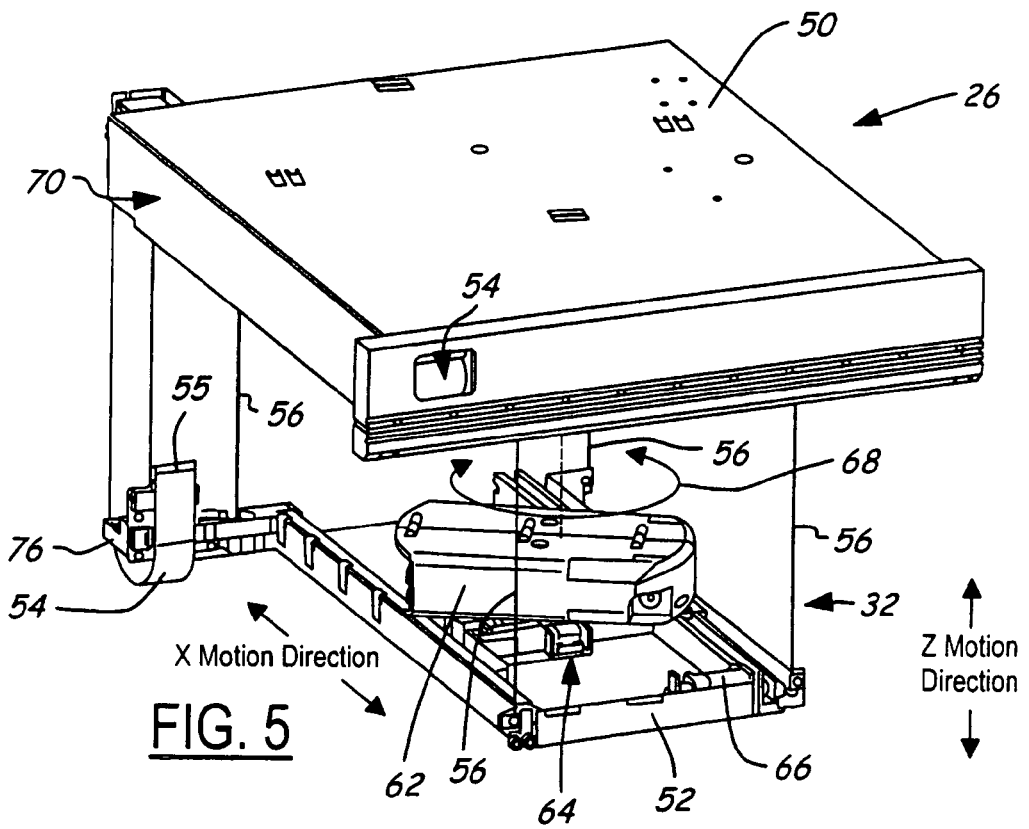
FIG. 5 illustrates a top-side perspective view of the robotics module with the media element handling robot assembly being moved out from its recessed position within the robotics module and the communications cable being extended out from the robotics module.
Figure 6:
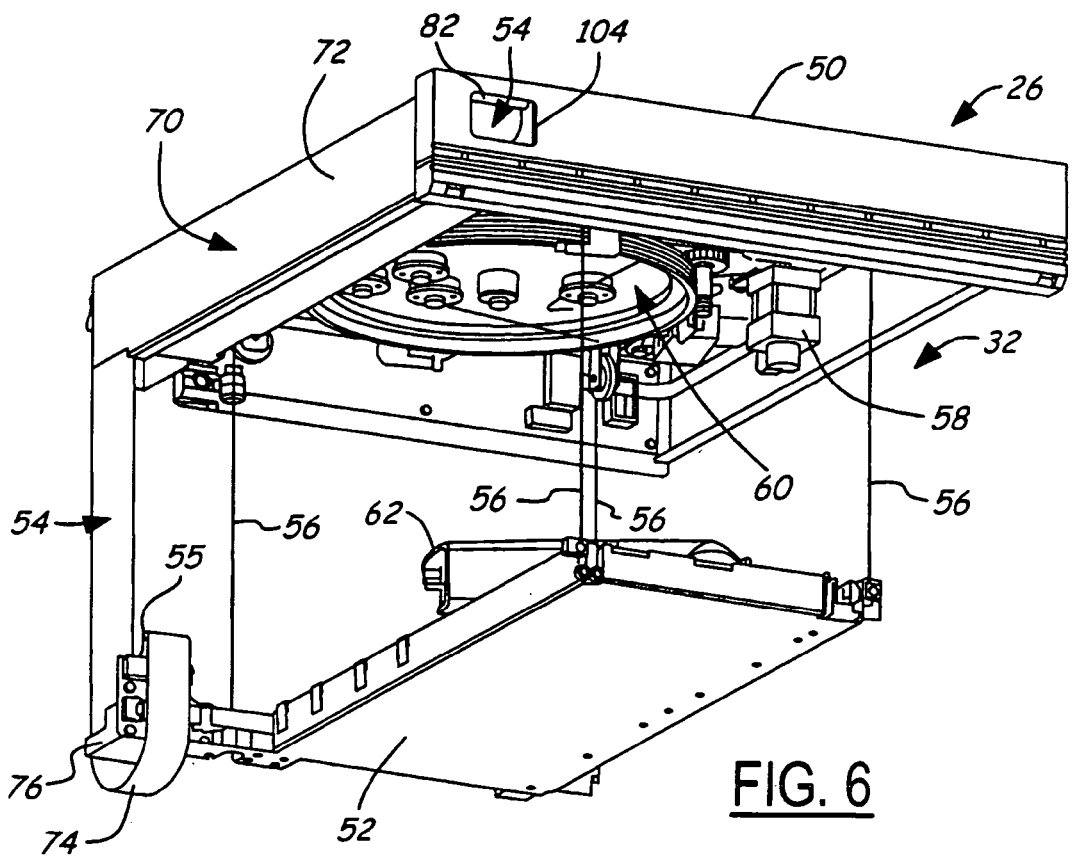
Figure 8:
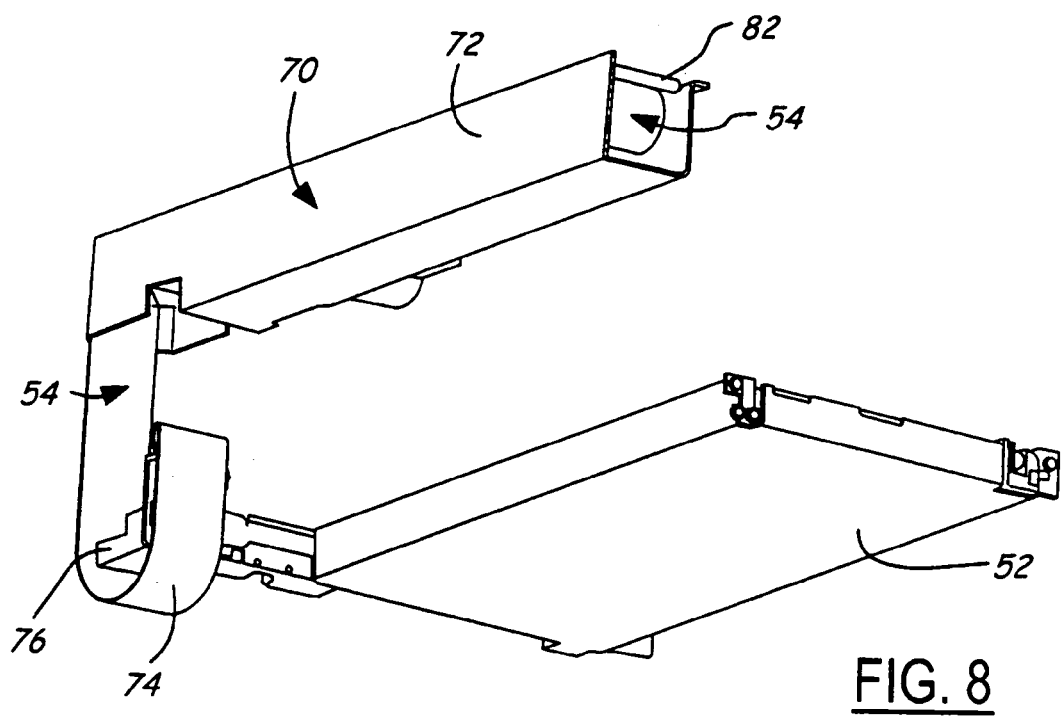
FIG. 8 illustrates a bottom-side perspective view of a self extending, retractable communications cable mechanism and a robot assembly platform of the media element handling robot assembly, with the communications cable connected between the cable mechanism and the platform being partially extended.

FIGS. 5, 6, and 7 illustrate top and bottom side perspective views of robotics module 26 with picker assembly 32 and its platform 52 being dropped down out from housing 50. A portion of communications cable 54 is extended out from robotics module 26. Communications cable 54 has a controller card connected at one end 55 to platform 52. As will be described in greater detail below, communications cable 54 enables electronic communication between an external device such as power/controller module 27 and picker assembly 32.

Picker assembly 32 includes four suspension cables 56 which are connected at each corner of platform 52. Suspension cables 56, such as steel rope cables, are fully wound up when platform 52 is fully recessed within housing 50.

Suspension cables 56 unwind to lower platform 52 out from housing 50, and, as a result, the platform moves down along a z-direction as the suspension cables unwind. Similarly, platform 52 moves up along the z-direction as the suspension cables wind up from an unwound position.

Robotics module 26 includes a z-drive motor 58 for winding and unwinding suspension cables 56. Z-drive motor 58 drives a suspension cable wheel 60 in order to wind and unwind suspension cables 56. Suspension cables 56 are fully wound around wheel 60 when platform 52 is fully recessed within housing 50. Similarly, suspension cables 56 unwind from wheel 60 as platform 52 is lowered out from housing 50. Z-drive motor 58 is in communication with an external device such as power/controller module 27 for receiving commands to control the z-direction movement of platform 52.

Robotics module 26 includes a self extending, retractable cable mechanism 70 housed in a containment box 72. Within containment box 72, communications cable 54 is wrapped around cable mechanism 70. Cable mechanism 70 is operable with communications cable 54 to enable the communications cable to release and self extend away from cable mechanism 70 as platform 52 is lowered out from housing 50. That is, cable mechanism 70 enables communications cable 54 to self extend out of containment box 72 as platform 52 moves down in the z-direction along channel 30 formed by storage library modules 28.

Communications cable 54 has a sufficient length to support the maximum extension of platform 52 away from robotics module 26. As such, the length of communications cable 54 supports the maximum expansion capacity of storage library 10. This eliminates the need for duplication of communications cable 54 when the capacity of storage library 10 is expanded. Requirements to adjust the length of communications cable 54 to support capacity expansion are eliminated as cable mechanism 70 allows platform 52 to pull the communications cable out from the cable mechanism in order for the communications cable to be fed into the expansion space.

That is, platform 52 pulls communications cable 54 out from cable mechanism 70 as the platform moves away from robotics module 26 in the z-direction along channel 30 formed by storage library modules 28. During operation, platform 52 will eventually move away from robotics module 26 to the extent of the maximum expansion of storage library 10, i.e., the platform will move to the lowest storage library module 28 in the vertical stack. The maximum extension of platform 52 away from robotics module 26 sets the length of the portion of communications cable 54 extending out from cable mechanism 70.

In order to enable platform 52 to pull communications cable 54 out from cable mechanism 70, the communications cable includes a loop 74 adjacent to first cable end 55 connected to the platform. Platform 52 includes an extension 76 which is connected to first cable end 55. Cable loop 74 surrounds platform extension 76. Platform extension 76 applies a force to cable loop 74 as platform 52 moves away from robotics module 26. For example, platform extension 76 subjects cable loop 74 to a portion of the weight of platform 52 as the platform moves down away from robotics module 26. The force applied by platform extension 76 on cable loop 74 pulls communications cable 54 out from cable mechanism 70.

After the length of communications cable 54 extending out from cable mechanism 70 has been adjusted to the maximum length, the cable mechanism prevents the communications cable from being retracted back into the cable mechanism when platform 52 moves away from its maximum extension and back towards robotics module 26. As such, communications cable 54 maintains the maximum extended length during operation of picker assembly 32. Cable mechanism 70 may be configured to automatically retract communications cable 54 back into the cable mechanism as platform 52 moves back towards robotics module 26. In this event, cable mechanism 70 may employ a spring or the like to enable real-time automatic retraction of communications cable 54 during operation of picker assembly 32.

Picker assembly 32 further includes a picker hand assembly 62 supported on a carriage assembly 64 movably connected to platform 52. Carriage assembly 64 is movable in an x-direction of motion along platform 52. An x-drive motor 66 drives carriage assembly 64 to move the carriage assembly along the x-direction. Hand assembly 62 moves in the x-direction of motion as carriage assembly 64 moves along the x-direction. Via communications cable 54, x-drive motor 66 is in communication with an external device such as power/controller module 27 for receiving commands to control the x-direction movement of carriage assembly 64.

Hand assembly 62 is also supported on carriage assembly 64 to be rotatable in a wrist direction of motion 68. Via communications cable 54, hand assembly 62 is in communication with an external device such as power/controller module 27 for receiving commands to control the wrist direction movement of the hand assembly.

Accordingly, hand assembly 62 has three directions of motion. One, hand assembly 62 is rotatable in the wrist direction of motion 68. Two, carriage assembly 64 moves hand assembly 62 along the x-direction. Three, platform 52 moves hand assembly 62 along the z-direction.

Hand assembly 62 is movable in the z-direction of motion to travel up-and-down through channel 30 formed by storage library modules 28 in order to move up-and-down amongst the storage library modules and to move up-and-down amongst a particular storage library module. Hand assembly 62 is movable in the x-direction of motion to move across a storage library module. Hand assembly 62 is rotatable in the wrist direction of motion to move next to a cell and/or a drive in order to grab a cartridge from its cell and insert this cartridge into another cell and/or another drive.

As described, robotics module 26 contains a free-hanging media picker assembly 32. The free-hanging design of picker assembly 32 enables robotics module 26 to be self-contained. That is, there is no attachment at bottom rack portion 16 as would be required with a pulley system. Because picker assembly 32 has a free-hanging configuration, there is no complicated support or drive structure required for operation of the picker assembly. Accordingly, picker assembly 32 is not affected by capacity upgrades. For instance, adding capacity to storage library 10 entails adding cartridges and/or drives to the storage library but does not entail adding any more media element handling robotics hardware.

As a result, the capacity of storage library 10 can be expanded by simply adding storage library modules 28, not having media element handling robotics, at a position below robotics module 26. As indicated above, communications cable 54 has a sufficient length to support the maximum extent of picker assembly 32 along channel 30 formed by storage library modules 28 and, consequently, has a sufficient length to support the capacity expansion of storage library 10.

Referring now to FIGS. 8, 9, 10, and 11, other features and the operation of communications cable 54 and cable mechanism 70 will now be described in greater detail. Communications cable 54 includes a second cable end which terminates at a controller card 57. Controller card 57 is connected to an external device such as power/controller module 27 in order to receive electrical command signals for controlling the operation of picker assembly 32.

Figure 9:
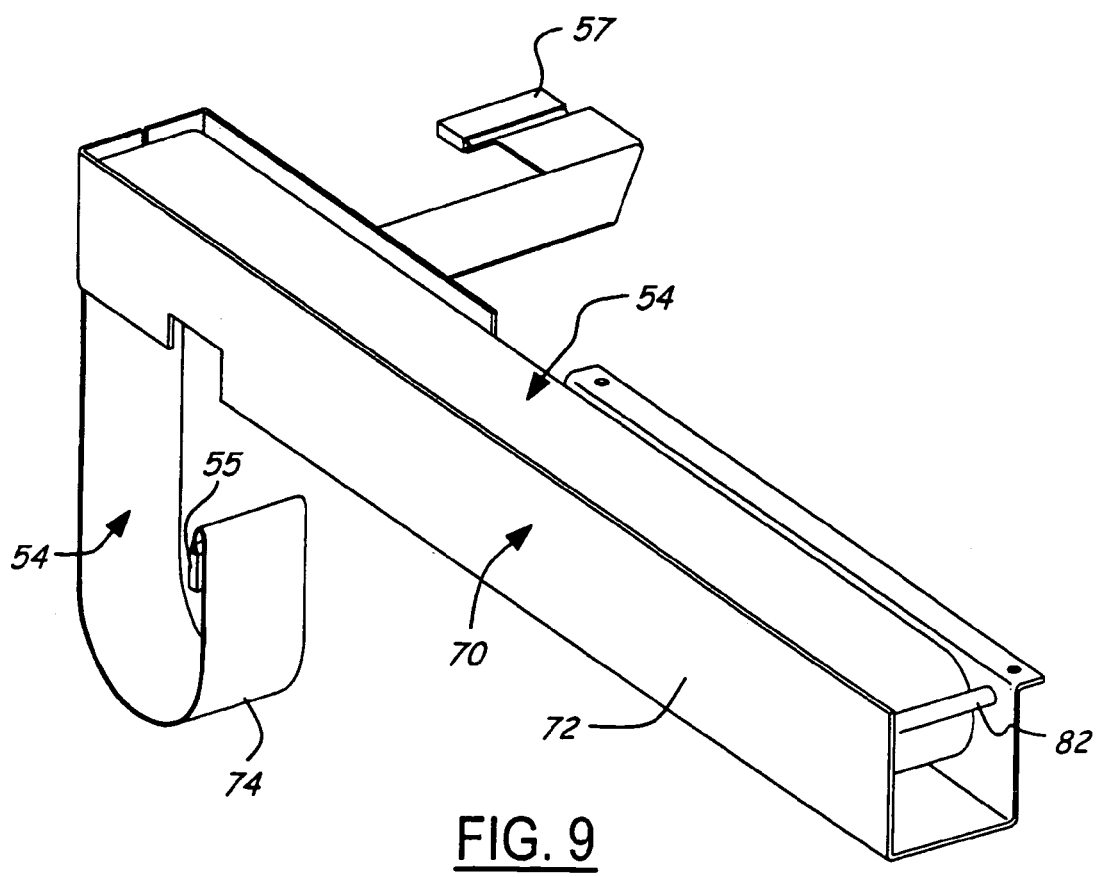
FIG. 9 illustrates a top-side perspective view of the self extending, retractable communications cable mechanism and the communications cable with the communications cable being partially extended.
Figure 10:
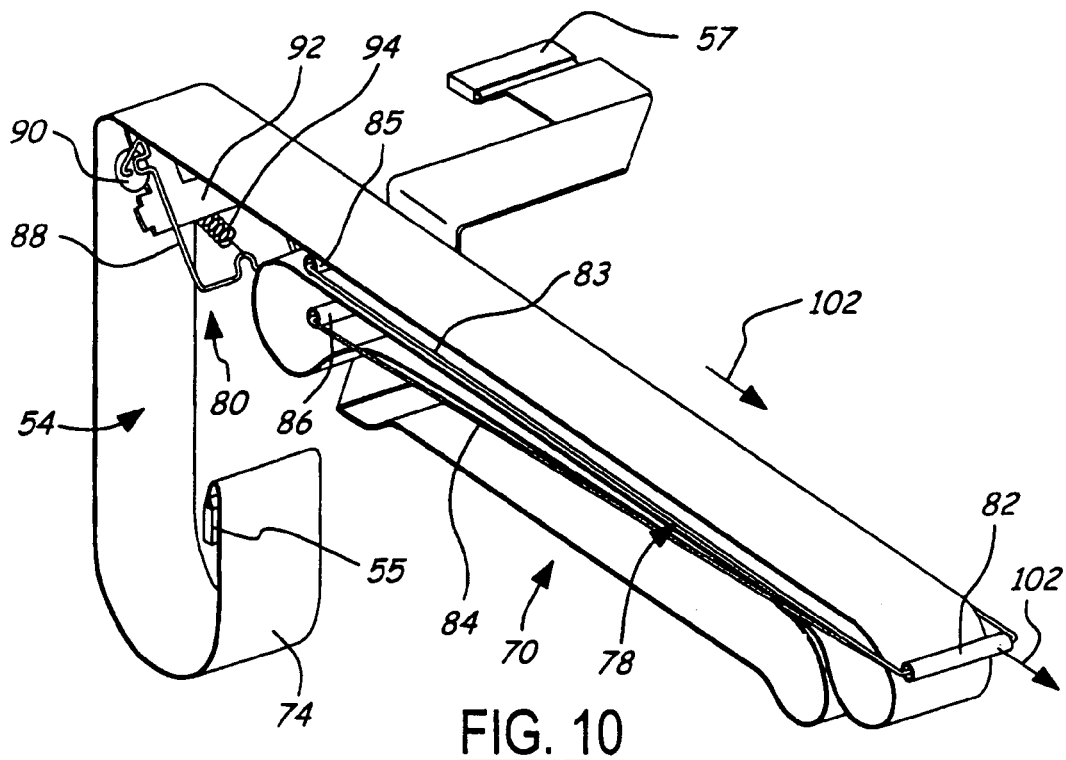
FIG. 10 illustrates a top-side perspective view of the self extending, retractable communications cable mechanism and the partially extended communications cable without illustrating a containment box of the cable mechanism.
Figure 11:
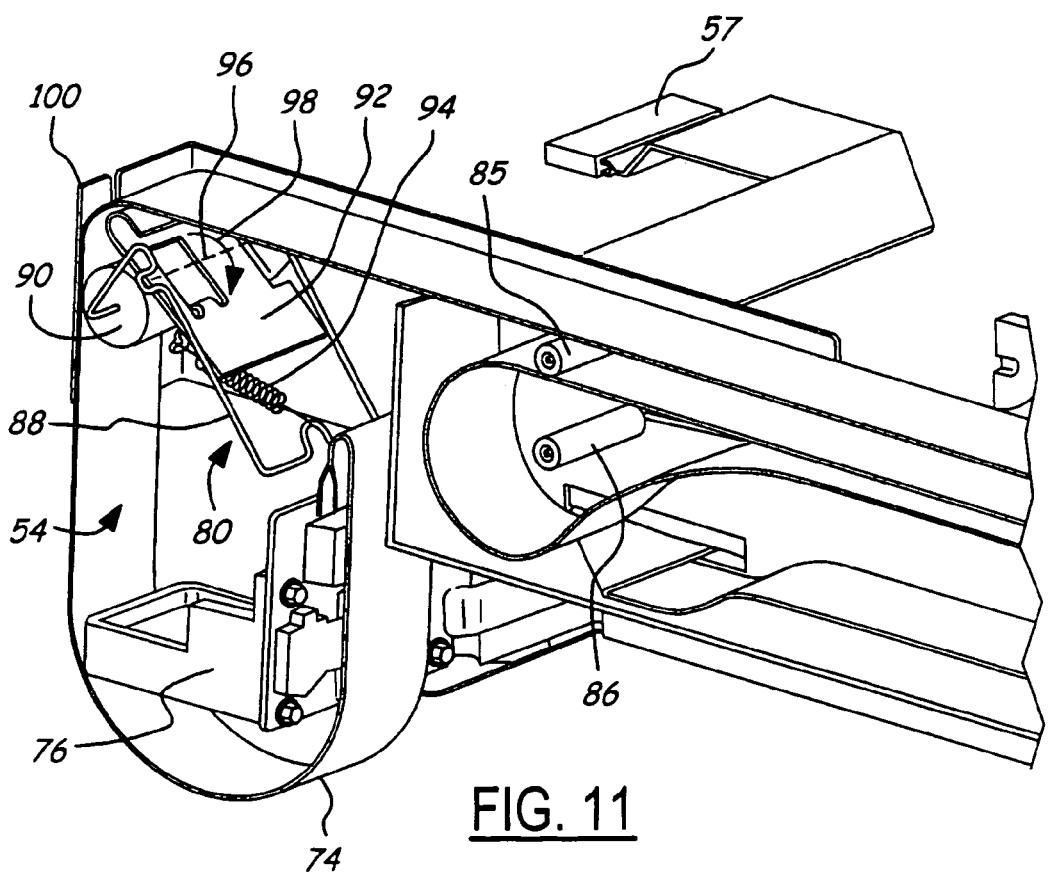
FIG. 11 illustrates a side-view of the self extending, retractable communications cable mechanism which illustrates operation of the cable mechanism in conjunction with the communications cable.

As best shown in FIGS. 9, 10, and 11, communications cable 54 is wrapped around cable mechanism 70. To this end, cable mechanism 70 includes a retraction handle assembly 78 and a tension spring assembly 80. Retraction handle assembly 78 includes a retraction handle 82 having two pairs of parallel, spaced-apart legs 83, 84 which terminate at respective rollers 85, 86. Communications cable 54 is routed through cable mechanism 70 such that retraction handle assembly 78 is contained between layers of the communications cable. As best shown in FIGS. 10 and 11, rollers 85, 86 separate layers of communications cable 54.

Tension spring assembly 80 includes a wire form component 88, a high friction cylinder roller 90 formed of soft rubber, a wedging plate 92, and a tension spring 94. Wire form component 88 is connected to cylinder roller 90 through the axis of the cylinder roller. Wedging plate 92 is fitted within a spacing formed by wire form component 88 and is secured to the wire form component within this spacing. Wire form component 88 may pivot about a pivot axis 96 which is parallel to the axis of cylinder roller 90. Wire form component 88 is connected to containment box 72 at pivot axis 96.

Tension spring 94 is connected between wire form component 88 and wedging plate 92 such that the wire form component and the wedging plate provide a torque load 98 about pivot axis 96. Torque load 98 acts on cylinder roller 90 to push the cylinder roller against a back side 100 of containment box 72 with communications cable 54 being interposed between the cylinder roller and the back side of the containment box. As such, communications cable 54 is wedged between two surfaces, i.e., is wedged between cylinder roller 90 and back side 100 of containment box 72. The wedging of communications cable 54 between cylinder roller 90 and back side 100 of containment box 72 prevents the communications cable from being retracted back into the containment box.

When picker assembly 32 moves away from robotics module 26 and pulls communications cable 54 in a direction out from containment box 72, the portion of the communications cable adjacent to wedging plate 92 acts against torque load 98 causing wire form component 88 to pivot about axis 96 in a direction opposite to the direction of the torque load. The pivoting of the wire form component in a direction opposite to the direction of torque load 98 causes cylinder roller 90 to be pulled away from back side 100 of containment box 72. As such, communications cable 54 is enabled to feed freely in the extension direction of picker assembly 32. Accordingly, cylinder roller 90 functions as a one-way ratchet.

When picker assembly 32 is retracted into robotics module 26, platform extension 76 contacts and pushes wire form component 88. Platform extension 76 pushes wire form component 88 such that the wire form component pivots about axis 96 in a direction opposite to the direction of torque load 98. This releases torque load 98 applied to cylinder roller 90 and causes the cylinder roller to be pulled away from back side 100 of containment box 72. As such, communications cable 54 is then enabled to be retracted back into containment box 72.

When cylinder roller 90 is pulled away from back side 100 of containment box 72 and communications cable 54 is enabled to be retracted back into containment box 72, retraction handle assembly 78 is configured to enable a user to manually retract the communications cable back into the containment box. To this end, the user pulls retraction handle 82 in retraction direction 102 out from containment box 72. Containment box 72 includes an access opening 104 for enabling the user to have access to retraction handle 82. As the user pulls retraction handle 82 in retraction direction 102, communications cable 54 is retracted back into containment box 72 and routed through cable mechanism 70 such that retraction handle assembly 78 is contained between layers of the communications cable. Fully retracting communications cable 54 into containment box 72 of robotics module 26 when picker assembly 32 is fully retracted into the robotics module enables modular removal and replacement of the robotics module from rack 12 of the storage library 10. To this end, retraction handle 82 can be returned at its original position in containment box 72 with communications cable 54 being routed through cable mechanism 70.

Figure 12:
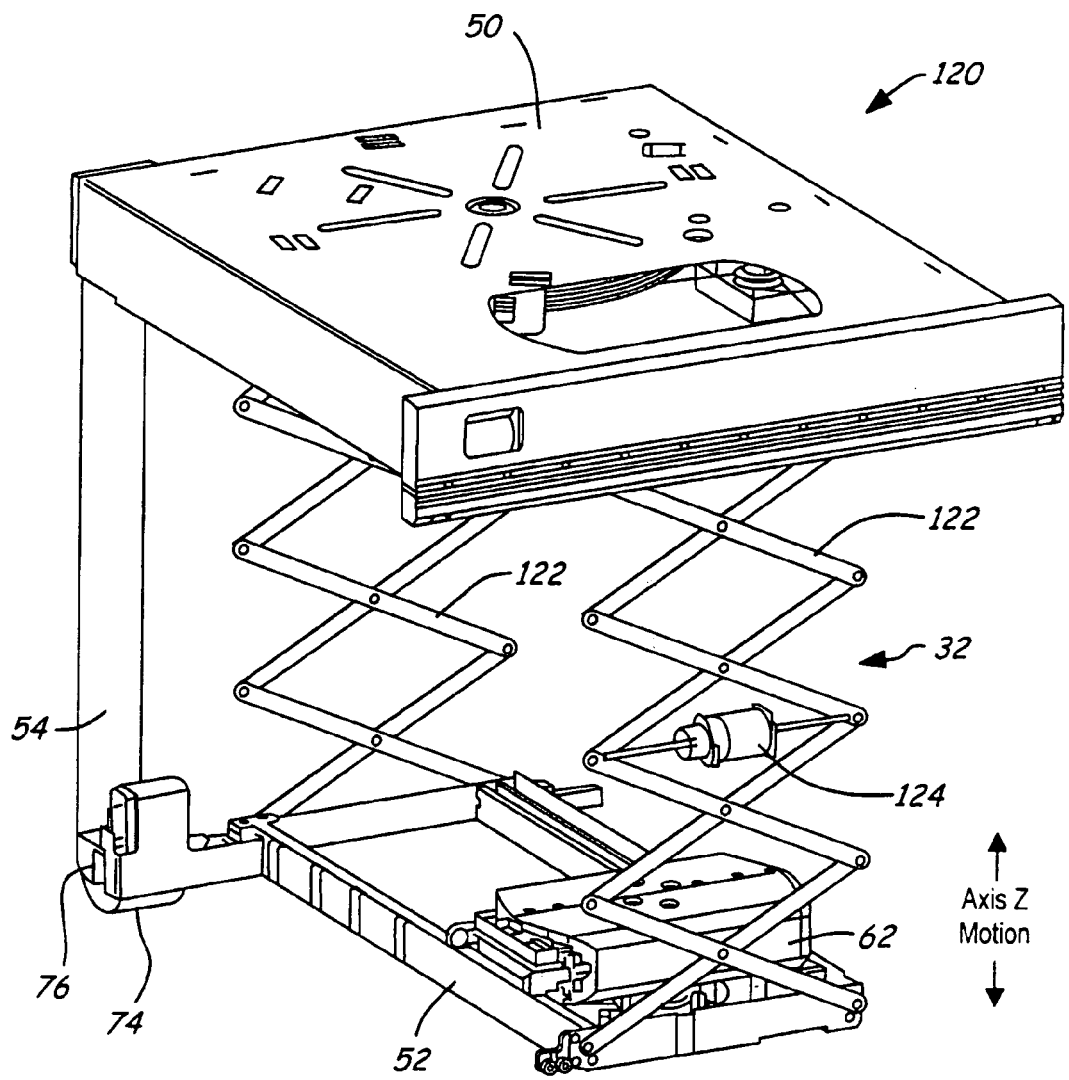
FIG. 12 illustrates a top-side perspective view of a robotics module in accordance with another embodiment with the media element handling robot assembly being moved out from its recessed position within the robotics module and the communications cable being extended out from the robotics module.

Referring now to FIG. 12, a top-side perspective view of a self-contained robotics module 120 in accordance with another embodiment is shown. Robotics module 120 includes many of the same elements as robotics module 26 and like components have the same reference numerals. In FIG. 12, media picker assembly 32 is moved out from housing 50. Robotics module 120 includes two scissor mechanism legs 122 which are connected at each corner of platform 52. Legs 122 are fully contracted when platform 52 is fully recessed within housing 50. Legs 122 expand to lower platform 52 out from housing 50, and, as a result, the platform moves down along the z-direction as the legs expand. Similarly, platform 52 moves up along the z-direction as legs 122 contract from an expanded position. Robotics module 26 includes a z-drive actuator 124 for contracting and expanding legs 122.

It is noted that the configuration of robotics module 120 lends itself to be placed at other locations in rack 12 than being placed adjacent to top rack portion 14 as with robotics module 26. For instance, robotics module 120 may be effectively flipped upside down and placed near bottom rack portion 16. In this event, legs 122 expand to raise (as opposed to lower) platform 52 to move out from housing 50 and move upward (as opposed to downward) along the z-direction.

Thus, it is apparent that there has been provided, in accordance with the present invention, a self extending, retractable communications cable mechanism for use with a media element handling robot assembly of a storage library robotics module that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A storage library comprising:
   a frame;
   a plurality of cells supported within the frame for holding media elements; and
   a module supported in the frame, the module having a housing and a robot assembly operable for moving away from the housing in order to move toward the cells and manipulate media elements supported by the cells, the module further having a communications cable routed around a cable mechanism within the housing, one end of the communications cable being connected with the robot assembly for enabling communications with the robot assembly, the cable mechanism being operable for enabling a portion of the communications cable to be pulled out from the cable mechanism as the robot assembly moves away from the housing.

2. The library of claim 1 wherein:

the cable mechanism is further operable for preventing the pulled out communications cable portion from being retracted back into the cable mechanism after the robot assembly has moved out of the housing.

3. The library of claim 2 wherein:

the cable mechanism is further operable for enabling the pulled out communications cable portion to be retracted back into the cable mechanism while the robot assembly is in the housing.

4. The library of claim 3 wherein:

the cable mechanism enables the pulled out communications cable portion to be manually retracted back into the cable mechanism while the robot assembly is in the housing.

5. The library of claim 3 wherein:

the cable mechanism includes a tension spring assembly which is configured to wedge the communications cable with a roller biased under a torque load to prevent the pulled out communications cable portion from being retracted back into the cable mechanism after the robot assembly has moved out of the housing.

6. The library of claim 5 wherein:

the tension spring assembly is configured to pull away the roller from the communications cable while the robot assembly is in the housing to enable the pulled out communications cable portion to be retracted back into the cable mechanism.

7. The library of claim 6 wherein:

the cable mechanism further includes a retraction handle assembly, wherein the retraction handle assembly enables a user to manually retract the pulled out communications cable portion back into the cable mechanism while the robot assembly is in the housing.

8. The library of claim 1 wherein:

the module is removably supportable out of the frame when the robot assembly is in the housing and the communications cable is retracted back into the cable mechanism.

9. The library of claim 1 wherein:

the module is removably supportable into the frame when the robot assembly is in the housing and the communications cable is retracted into the cable mechanism.

10. The library of claim 1 wherein:

the robot assembly includes a platform and the end of the communications cable connected to the robot assembly forms a loop around an extension of the platform, wherein the platform extension applies a force on the cable loop as the robot assembly moves away from the housing causing the portion of the communications cable to be pulled out from the cable mechanism.

11. The library of claim 10 wherein:

the force applied by the platform extension on the cable loop is caused by the weight of the platform as the robot assembly moves down and away from the housing.

* * * * *